(12) United States Patent
Buckland et al.

(10) Patent No.: US 6,434,166 B1
(45) Date of Patent: Aug. 13, 2002

(54) METHOD FOR UNIVERSAL CHANNEL ALLOCATION BASED ON DS-0 CHANNELIZED FORMAT

(75) Inventors: Kenneth M. Buckland, Rohnert Park; Jan C. Hobbel, Cotati; Earl B. Manchester, Rohnert Park, all of CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/364,770

(22) Filed: Jul. 30, 1999

Related U.S. Application Data

(63) Continuation-in-part of application No. 09/150,904, filed on Sep. 10, 1998.

(51) Int. Cl.[7] .......................... H04L 12/66; H04L 12/28; H04J 3/12
(52) U.S. Cl. ....................... 370/468; 370/352; 370/389; 370/396; 370/523
(58) Field of Search .................. 370/467, 468, 370/474, 487, 522, 523, 524, 528, 537, 249, 351, 352, 353, 377, 384, 389, 392, 396, 431, 466; 379/204, 229

(56) References Cited

U.S. PATENT DOCUMENTS

| | | | | |
|---|---|---|---|---|
| 4,154,983 A | * | 5/1979 | Pedersen ..................... 370/352 |
| 4,408,323 A | * | 10/1983 | Montgomery ................ 370/389 |
| 4,730,312 A | * | 3/1988 | Johnson et al. .............. 370/523 |
| 4,928,276 A | * | 5/1990 | Blondeau, Jr. et al. ..... 370/523 |
| 5,398,234 A | * | 3/1995 | O'Connell et al. ......... 370/249 |
| 5,467,344 A | * | 11/1995 | Solomon et al. ............ 370/396 |
| 5,661,725 A | * | 8/1997 | Buck et al. .................. 370/377 |
| 5,889,773 A | * | 3/1999 | Stevenson, III ............. 370/352 |
| 6,009,106 A | * | 12/1999 | Rustad et al. ................ 307/523 |
| 6,018,525 A | * | 1/2000 | Sucharczuk ................. 370/394 |
| 6,157,634 A | * | 12/2000 | Mehta et al. ................ 370/351 |
| 6,272,128 B1 | * | 8/2001 | Pierson, Jr. ................. 370/352 |

* cited by examiner

Primary Examiner—Huy D. Vu
Assistant Examiner—M. Phan
(74) Attorney, Agent, or Firm—Baker Botts L.L.P.

(57) ABSTRACT

A universal DS-0 channelized format is provided wherein selected states of CAS bits are used to indicate to the transport mechanism when DS-0 channels are not being used for voice and are available for use for data transport. In addition, the T1 frame format carries CAS bits only in the first DS-0 channel, so that robbed bits are disabled and not used to carry ABCD signaling bits, thereby avoiding any risk of data corruption. Still further, a special CAS signaling value not defined as a CAS state, is employed in a frame nibble instead of a frame counter to indicate that the state is in the first DS-0 slot.

4 Claims, 1 Drawing Sheet

| FRAME NUMBER | DS-0 TO CAS MAPPING | |
|---|---|---|
| | CAS NIBBLE 0 | CAS NIBBLE 1 |
| 1 | FRAME NIBBLE | 2 |
| 2 | 3 | 4 |
| 3 | 5 | 6 |
| 4 | 7 | 8 |
| 5 | 9 | 10 |
| 6 | 11 | 12 |
| 7 | 13 | 14 |
| 8 | 15 | 16 |
| 9 | 17 | 18 |
| 10 | 19 | 20 |
| 11 | 21 | 22 |
| 12 | 23 | 24 |
| 13 | DATALINK | |
| 14 | DATALINK | |
| 15 | DATALINK | |
| 16 | DATALINK | |
| 17 | DATALINK | |
| 18 | DATALINK | |
| 19 | DATALINK | |
| 20 | DATALINK | |
| 21 | DATALINK | |
| 22 | DATALINK | |
| 23 | DATALINK | |
| 24 | DATALINK | |

| BIT POSITION | 0 | 1 | 2 | 3 | 4 | 5 | 6 | 7 |
|---|---|---|---|---|---|---|---|---|
| CAS NIBBLE | 0 | | | | 1 | | | |
| FUNCTION | A | B | C | D | A | B | C | D |

20    22

| | DS-0 TO CAS MAPPING | |
|---|---|---|
| FRAME NUMBER | CAS NIBBLE 0 (15) | CAS NIBBLE 1 |
| 1 | FRAME NIBBLE | 2 |
| 2 | 3 | 4 |
| 3 | 5 | 6 |
| 4 | 7 | 8 |
| 5 | 9 | 10 |
| 6 | 11 | 12 |
| 7 | 13 | 14 |
| 8 | 15 | 16 |
| 9 | 17 | 18 |
| 10 | 19 | 20 |
| 11 | 21 | 22 |
| 12 | 23 | 24 |
| 13 | DATALINK | |
| 14 | DATALINK | |
| 15 | DATALINK | |
| 16 | DATALINK | |
| 17 | DATALINK | |
| 18 | DATALINK | |
| 19 | DATALINK | |
| 20 | DATALINK | |
| 21 | DATALINK | |
| 22 | DATALINK | |
| 23 | DATALINK | |
| 24 | DATALINK | |

METHOD FOR UNIVERSAL CHANNEL ALLOCATION BASED ON DS-0 CHANNELIZED FORMAT

CROSS REFERENCE TO RELATED APPLICATION

This application is a continuation-in-part of U.S. patent application Ser. No. 09/150,904 filed Sep. 10, 1998, and entitled "Method for Universal Channel Allocation Based on DS-0 Channelized Format."

TECHNICAL FIELD OF THE INVENTION

This invention relates to digital communications, and in particular to channelized digital data communications over digital loop carrier wired networks. The invention has particular application in distributed digital switching systems for high-speed digital communications.

BACKGROUND OF THE INVENTION

The T1 time division multiplexed (TDM) transmission format is a format widely deployed in North America for the transport of multiplexed voice channels. A T1 signal consists of 24 DS-0 channels that are intended to transport an eight-bit voice sample every frame period, with the frame repeating each 125 µs to yield an overall bit rate per DS-0 channel of 64,000 b/s. Each T1 frame includes a single framing bit, resulting in a total of 193 bits per each 125 µs frame for a bit rate of 1.544 Mb/s.

Originally designed to carry voice information over trunk lines, more recent uses of T1 have been data transport and voice and data transport, in which digital data and digitized voice are each allocated one or more DS-0 channels.

Each DS-0 channel has associated with it Channel Associate Signaling (CAS) signaling bits. These may be ABCD bits or AB bits, either of which are used to indicate the channel status of the line with which it is associated, such as telephone off-hook, ring, etc. Since CAS bits do not need to be updated very often, they are typically transported in a T1 format as part of a superframe or an extended superframe constructed by robbing lower significant bits from selected DS-0 channels. Specifically, a superframe is formed from a series of twelve T1 frames by robbing all of the DS-0 voice channels of their least significant bit every sixth T1 frame. Since two robbed bits are used every such superframe, AB CAS transport is allowed.

Similarly, an extended superframe is formed from twenty-four T1 frames by robbing all of the DS-0 voice channels of their least significant bit every sixth T1 frame. Since four robbed bits are used every such extended superframe, ABCD CAS transport is allowed.

If the robbed DS-0 channel is used to carry digital data, then data corruption inevitably occurs, to the detriment of data transmission in that DS-0 channel. In the past, to solve this problem, either the robbed bit signaling has been deactivated for each DS-0 channel or only the seven most significant bits (7 MSBs but not the LSB) are used for data transport. Neither solution has been wholly satisfactory because the former prevents voice transport over the DS-0 channel. It is not always desirable to limit a particular DS-0 channel and the latter significantly reduces the bandwidth available for data transmission. The former also prevents dynamic allocation of voice and data channels.

The TDM communication standard in Europe known as E1 is a similar standard to that of the American T1 standard. However, E1 transmission format allocates the 17th byte in a 32 DS-0 frame to carry CAS nibbles.

Those of ordinary skill in the art should be aware of the background information found in the following typical publications:

"Functional Criteria for DLC Systems," Bellcore TR-NWT-000057, Issue 2, January 1993;

"Transport Systems Generic Requirements(TSGR): Common Requirements," Bellcore GR-499-CORE, Issue 1, December 1995; and "Digital Interface Between SLC96 Digital Loop Carrier System and Local Digital Switch," Bellcore TR-TSY-000008, Issue 2, August 1987.

What is needed is a mechanism to optimize usage of a T1 resource by pooling DS-0 channels to carry data traffic when not used to carry voice traffic.

SUMMARY OF THE INVENTION

According to the invention, a universal DS-0 channelized format is provided wherein selected values of CAS bits are used to indicate to the transport mechanism when DS-0 channels are not being used for voice and are available for use for data transport. In addition, the T1 frame format carries CAS bits only in the first DS-0 channel, so that robbed bits are disabled and not used to carry CAS signaling bits, thereby avoiding any risk of data corruption. Still further, a special CAS signaling value not defined as a standard CAS value, is employed in a frame nibble instead of a frame counter to indicate that the state is in the first DS-0 slot.

By allocating an entire DS-0 channel or 1/24th of a T1 frame to signaling bits and datalink bits, the T1 frame actually achieves higher integrity for data, improved data throughput and decreased data loss, thus increasing data capacity without significantly altering the infrastructure underlying T1 signaling.

The invention will be better understood by reference to the following detailed description in connection with the accompanying drawings.

BRIEF DESCRIPTION OF THE DRAWINGS

For a more complete understanding of the present invention, and for further features and advantages, reference is now made to the following description taken in conjunction with the accompanying drawings, where like reference numerals represent like parts, in which.

DETAILED DESCRIPTION OF THE INVENTION

Figures 1, 2, 3:
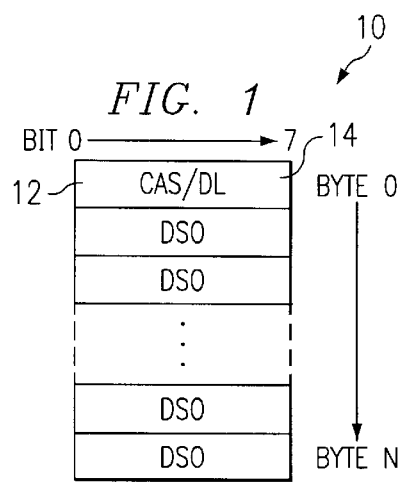
FIG. 1 is a block diagram of a T1 frame illustrating allocation of bits among DS-0 channels according to the invention.
FIG. 2 is a table illustrating CAS/ABCD bit mapping.
FIG. 3 is a table illustrating DS-0 to CAS mapping for a T1 frame.

Referring to FIG. 1, there is shown a two-dimensional block diagram of a portion of a frame 10 illustrating allocation of bits among N DS-0 channels according to the invention within a frame wherein robbed bits are disabled. In a T1-type frame, the number N of DS-0 channels is 24. Bits 0 through 7 are allocated across the horizontal axis and bytes 0 through N are stacked in order along the vertical axis. A half-byte segment is called a nibble, and it consists of four bits. The first DS-0 channel is allocated to CAS signaling bytes 12 and alternatively Datalink bytes 14. The CAS bytes 12 refer to a different pair of DS-0 channels every frame period, as illustrated in FIG. 2. The sequence repeats each superframe as illustrated in FIG. 3.

Referring to FIG. 2, the CAS nibble mapping allocates the first four bit positions 20 (Nibble 0) to a second ABCD CAS transport and the second four bit positions 22 to ABCD CAS transport.

Referring to FIG. 3, there is shown a table illustrating CAS/ABCD bit mapping. DS-0 Frame 1, Nibble 0 (15) is, according to this improvement invention, assigned to a Frame Nibble that indicates when the state is in the first DS-0 slot, since it refers to that byte carrying the CAS nibbles. No frame counter is employed following the CAS/DL byte (FIG. 1). CAS Nibble 0 maps to DS-0 position 1, as the Frame Nibble (FIG. 3). CAS Nibble 1 maps to DS-0 position 2. Channels 3–24 are mapped to consecutive nibbles of frames 2–12. The remaining 12 frames of a T1 transport are mapped to datalink functions. The datalink bytes (DL) are transmitted over the first byte in the frame when all the CAS nibbles for an extended superframe have been transmitted. The invention thus uses the first byte of a 24 channel DS-0 frame to carry CAS nibbles, thereby enabling dynamic voice/data allocation in an overall transmission format that is straightforward to implement. This is achieved by using a fixed 4-bit value (specifically by proposed convention herein as "0011") to indicate that a DS-0 is available for data transport.

The Frame Nibble 15 indicates that the current frame is in fact Frame 1. The Frame Nibble 15 is a fixed 4-bit value (specifically by proposed convention herein as "1101") that does not correspond to any standard ABCD bit values, nor does it corresponded to the "available for data" bit value. As a result, the appearance of this fixed value at this position uniquely indicates that the state is Frame 1. This nibble can then be used as a FRAME NIBBLE instead of as a CAS value, because it is known that the DS-0 byte which would normally be undefined or referring to itself in that position, is now available for this enhanced function.

The Frame Nibble is required when the transmission format being used does not provide extended superframe indications, normally done with the framing bit according to T1 transmission.

In some cases, a group of DS-0 channels from a given T1 conduit may be switched through a number of transmission stages, all of which operate at different extended superframe phases. This has the effect of destroying the relationship between the transmission extended superframe and the CAS nibbles, which results in associating the CAS nibble with the wrong DS-0 channel. By including the Frame Nibble in the CAS/Datalink byte, the proper relationship can be maintained regardless of any extended superframe alterations.

Specifically, the method of the invention involves reserving at least a portion of the first one of the circuit-switched DS-0 channels for carrying CAS signaling bits as a signaling channel, consolidating the CAS signaling bits for all of the circuit-switched channels into the first DS-0 signaling channel, and including in the signaling bits of each of the circuit-switched channels a specific ABCD code indicating whether that particular circuit-switched channel is currently available for carrying data-type traffic. Alternatively the inverse indicates that it is capable of being currently available for carrying voice traffic, which is typically more time sensitive. A nonstandard ABCD code is used to indicate that the CAS nibble 0 is used as a "Frame Nibble." Thus the DS-0 channels can be dynamically allocated to a pool available to carry data services.

This invention has many advantages. There is no need to hard allocate a switched channel to data or voice; it can be allocated on demand. This means better signalling control without loss of data integrity, and it helps improve throughput. It departs from conventional wisdom by surrendering use of a channel to increase data quality and data throughput.

The invention has been explained with reference to specific embodiments. Other embodiments will be apparent to those of ordinary skill in the art. For example, this CAS nibble format can be used for any DS-0 channelized transmission format that carries up to 46 DS-0 channels. Twenty-three frames of the 24 frames in a unit can carry up to 46 CAS nibbles, the last frame being needed for a datalink byte, at least one of which is required for each extended superframe. If there fewer than 46 DS-0 channels in a channelized transmission format, then there is room for more than one datalink byte. A specific application is the transport of channelized frames containing a variable number of DS-0 channels per frame, such as HDSL transmission systems. The channel capacity is determined by the bit rate supportable by the selected modulation scheme and transmission medium capacity. A typical transmission system may be able to support up to 32 DS-0 channels. It is therefore not intended that this invention be limited, except as indicated by the appended claims.

What is claimed is:

1. In a channelized digital communication system employing a time division multiplexed channelized frame format having signaling bits, a method for dynamically allocating circuit-switched communication channels between digitized voice service and digitized data service, wherein a plurality of fixed length time frames are packaged into a fixed length superframe of a repeating bit, byte, and frame format, each said time frame containing a plurality of subframes, each said subframe supporting a single one of said circuit-switched communication channels, said method comprising:

reserving at least a portion of one of said circuit-switched channels for carrying said signaling bits as a signaling channel;

consolidating said signaling bits for all said circuit-switched channels into said signaling channel;

including in said signaling bits of each said circuit-switched channels a code indicative that said circuit-switched channel is currently available for carrying data as an inverse of being currently available for carrying voice, thereby allocating said circuit-switched channel to a pool available to carry data services; and further including in said signaling bits a code to indicate presence of a frame nibble which specifies state as being a first slot.

2. The method according to claim 1 wherein said allocating is such that more time frames are provided in the superframe than are required to transport all signalling bits.

3. The method according to claim 1 further including carrying information pertaining to the transmission channels for enhancing framing.

4. The method according to claim 1 wherein at least one channel is always allocatable to data.

* * * * *